J. T. JONES.
CALCULATING INSTRUMENT.
APPLICATION FILED DEC. 17, 1914.

1,214,040.

Patented Jan. 30, 1917.
3 SHEETS—SHEET 1.

Inventor
J. T. Jones

J. T. JONES.
CALCULATING INSTRUMENT.
APPLICATION FILED DEC. 17, 1914.
1,214,040.
Patented Jan. 30, 1917.
3 SHEETS—SHEET 2.
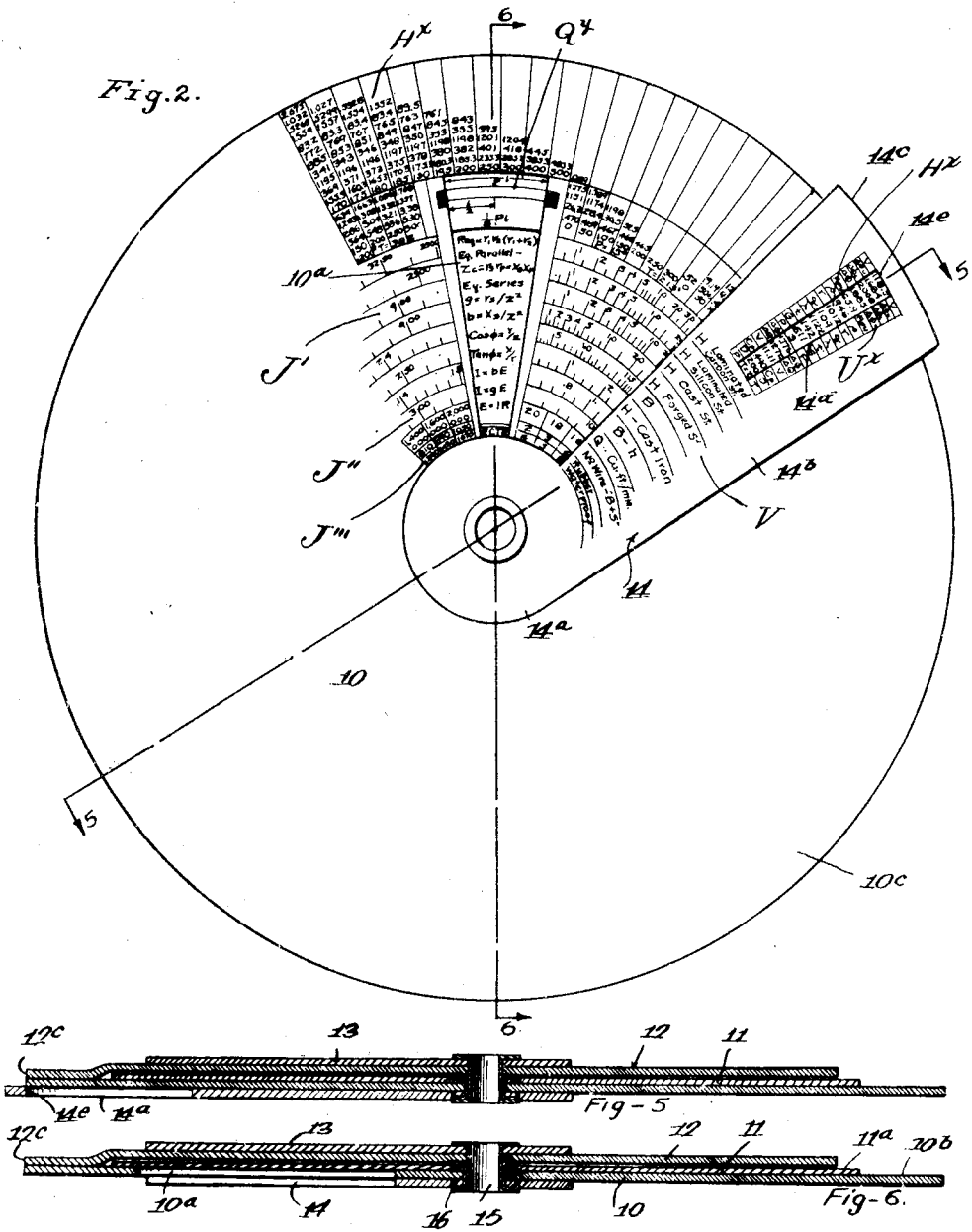

UNITED STATES PATENT OFFICE.

JOHN T. JONES, OF CLIFTON, NEW YORK.

CALCULATING INSTRUMENT.

1,214,040. Specification of Letters Patent. Patented Jan. 30, 1917.

Application filed December 17, 1914. Serial No. 877,708.

*To all whom it may concern:*

Be it known that I, JOHN T. JONES, a citizen of the United States, residing at Clifton, Staten Island, New York, have invented certain new and useful Improvements in Calculating Instruments; and I do hereby declare the following to be a full, clear, and exact description of the invention, such as will enable others skilled in the art to which it appertains to make and use the same.

This invention relates to calculating instruments of the class commonly known as slide rules, and has particular application to a multiple slide rule through the medium of which abstruse, intricate mathematical calculations such as usually occur in civil, mechanical and electric engineering and similar professions may be rapidly, accurately and conveniently determined.

In the present instance I propose to provide an instrument through the medium of which ordinary engineering calculations may be made much more rapidly than is possible with the ordinary form of slide rule, while at the same time the rule itself is so constructed that the operation of the same is greatly simplified.

Furthermore, I propose to provide an instrument of this character wherein the mathematical scales are so arranged as to enable the operator to make the desired calculation with but relatively few movements of the parts of the scale, thus accomplishing a considerable saving of time.

Furthermore, it is my purpose to provide a calculating instrument which will embody the desired features of efficiency and reliability and which may be manufactured and marketed at a relatively low cost.

With the above recited objects and others of a similar nature in view, my invention consists in the construction, combination and arrangement of parts set forth in and falling within the scope of the appended claims.

Figure 1:
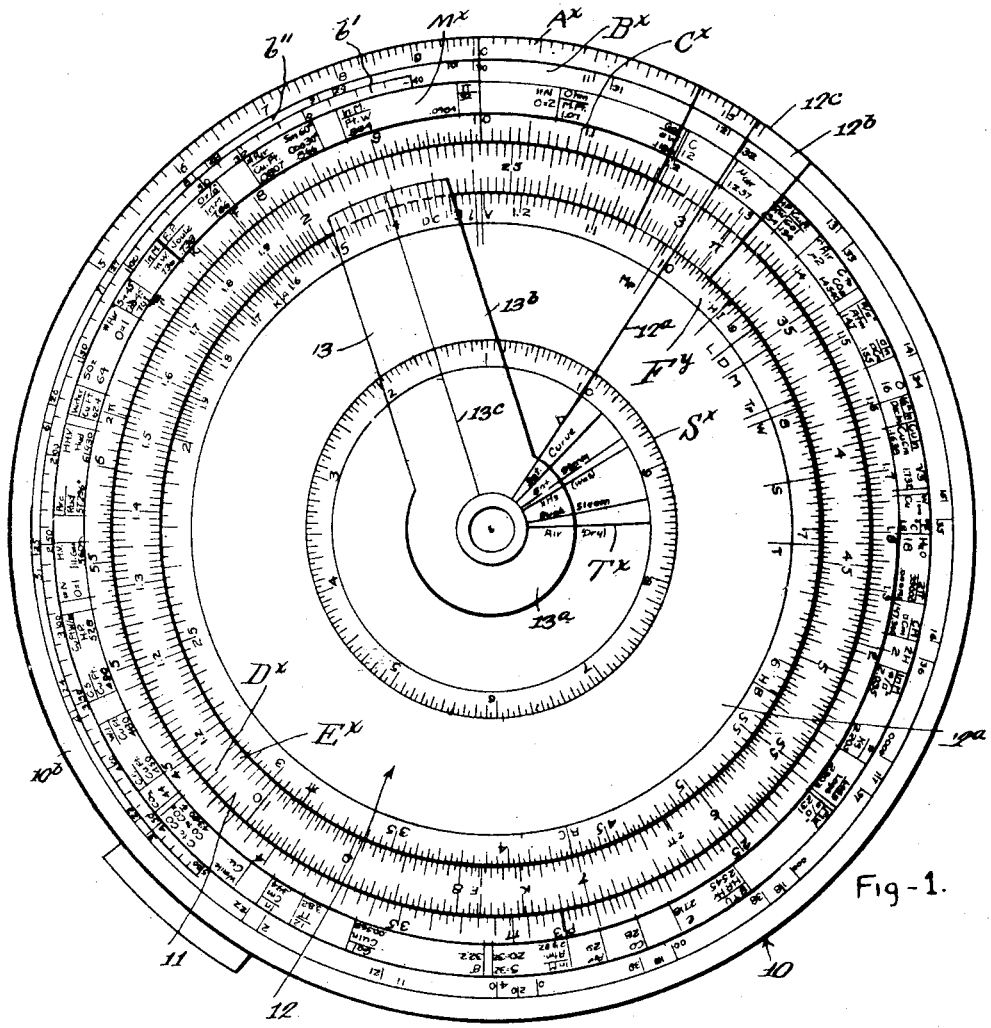
Figure 4:
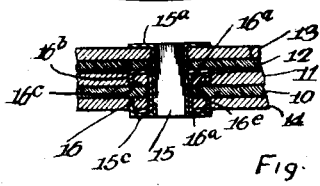
Figure 3:
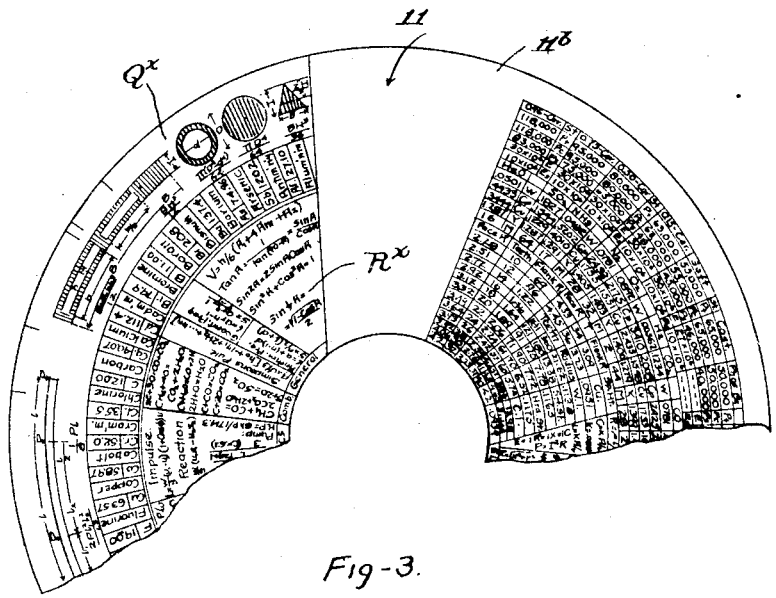
Figure 7:
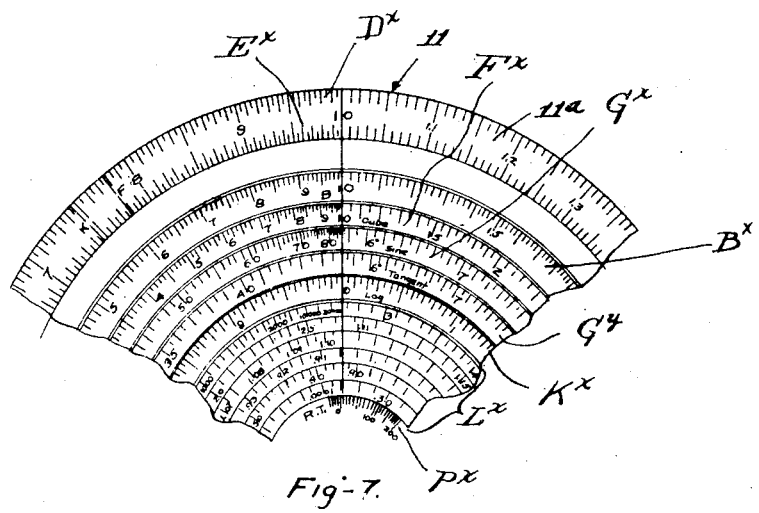

In the accompanying drawings:—Figure 1 is a top plan view of calculating instrument embodying my invention. Fig. 2 is a bottom plan view thereof. Fig. 3 is a plan view of the bottom or reverse face of the circular or disk-like slide. Fig. 4 is an enlarged detail vertical sectional view taken through the center of the instrument and showing the device for connecting together the various members or parts of the instrument. Fig. 5 is a sectional view taken on the line 5—5 of Fig. 2. Fig. 6 is a similar view taken on the line 6—6 of Fig. 2. Fig. 7 is a top face view of the circular slide or disk.

Before entering into a detail description of my invention I will briefly state that in its structural features it embodies a relatively large circular or disk-like base provided on both its top and bottom face with certain scales hereinafter specifically mentioned. Independently and freely movable over the top face of this base is a circular slide or disk which is of relatively less cross dimension than the base, the obverse and reverse faces of this slide having mathematical scales and data marked thereon, the scales or data on the bottom or reverse face being capable of showing through a segmental radial slot cut in the circular base. Swinging or traveling over the reverse or bottom face of this circular base is an index arm which is connected to rotate with the circular slide moving over the upper face of the base, this slide having a slot therein for the purpose hereinafter mentioned.

Rotatably mounted to travel over the top or obverse face of the circular slide is a cursor member including a circular section and a radially extending tongue-like section the outer edge of which reaches to the outer edge of the circular base. This cursor is surmounted by a second smaller cursor which is also in the present instance in the form of a disk-like section and a tongue-like section, these two cursors being preferably made of transparent material and ordinarily frictionally engaging each other so as to be shiftable or rotatable together, but when desired one cursor may be turned independently of the other by holding one of the cursors and shifting the other with the hand. The index arm traveling over the under face of the base is also provided with certain mathematical characters or formula while the larger of the cursors, or that one traveling directly over the obverse or top face of the circular slide is likewise marked with certain mathematical scales.

Referring now to the accompanying drawings in detail, the numeral 10 designates a circular or disk-like base, of any suitable size, and preferably formed of opaque material, such as board, card-board, wood, metal or the like. This base is provided with a radially extending segmental closed slot $10^a$ the inner narrowed end of which lies adjacent the center of the base while the outer widened end thereof terminates inward of the periphery of the base, the slot preferably extending about two-thirds of the distance measured from the center of the base to the periphery thereof. The top face of the base 10 is indicated by the numeral $10^b$ while the bottom face is designated by the numeral $10^c$. Mounted to rotate over the top face $10^b$ of the base is a circular disk or slide 11 which is also preferably formed of opaque material such as board, card-board, wood, metal or the like, this disk being preferably smaller or of less diameter than the base 10. The upper or obverse face of this circular slide is shown at $11^a$ while the lower or reverse face thereof is indicated at $11^b$. Rotating over the obverse or top face $11^a$ of the circular disk or slide is a member which I have termed for the sake of convenience a "cursor", this cursor being indicated by the numeral 12. This cursor is preferably formed of celluloid or some other transparent material and includes a circular portion $12^a$ of smaller, or relatively less cross dimension than the circular slide 11, this circular portion $12^a$ of the cursor being arranged concentrically with the slide. Formed integrally with and extending radially from the circular portion $12^a$ of the cursor is a flat segmental tongue $12^b$, the outer edge $12^c$ of which alines or registers with the periphery of the circular base 10. Mounted upon the cursor 12 is a second similar cursor 13, this latter cursor being also preferably formed of a transparent material, such as celluloid, and comprises an approximately circular portion $13^a$ arranged concentrically to the circular portion of the cursor 12, and a relatively long tongue section $13^b$ which is formed integral with the circular portion $14^a$ and extends to and beyond the periphery or outer edge of the circular portion $12^a$ of the first mentioned cursor. The cursor 12 is provided with a radially extending hair-line $12^b$, while the cursor 13 is provided with a similar hair-line $13^c$, these hair-lines in both cases extending from the center of the respective cursors to the outer edges of the flat tongues thereof. Mounted to rotate over the bottom or reverse face $10^c$ of the base 10 is an index arm 14. This index arm is preferably formed of opaque material such as board, card-board, wood, metal or the like and comprises a circular section $14^a$ from which extends the relatively flat outwardly flaring arm $14^b$, the outer edge $14^c$ of this arm extending beyond the periphery of the base 10 as shown in Fig. 2. This index arm is provided with a longitudinally extending closed slot $14^d$, the outer end $14^e$ of which registers with the periphery of the base 10 while the inner end thereof terminates at a point about one-third the distance inward toward the center of the index arm. It is to be understood that these five members of the instrument, that is to say the base 10, the circular disk or slide 11, the cursors 12 and 13 and the index arm 14 are all connected at their centers, and in the present instance this connection is in the nature of a tubular rivet 15, the top flange $15^a$ of which overlies the top cursor 13, while the bottom flange $15^b$ of this tubular rivet or stud lies beneath the lower face of the index arm 14.

In this instrument it is desirable to have the circular disk or slide 11 connected with the index arm 14, so as to turn therewith, while at the same time both of these members 11 and 14 will rotate around the rivet or stud 15. I accomplish this through the medium of a special rivet 16 which is sleeved on the main stud or rivet 15 this tubular rivet 16 having an upper attaching flange $16^a$ which extends over the adjacent portion of the slide 11 and is then bent vertically downward as at $16^b$ and extended through the slide 11 and then bent inward as at $16^c$ against the adjacent portion of the under face of the slide 11 so that the slide is firmly connected with the rivet. Likewise the lower end of the rivet 16 is formed with an attaching flange $16^d$ for connection with the index arm 14, this flange $16^d$ lying beneath the adjacent portion of the index arm and being upturned at its edge as at $16^e$ to puncture the index arm as is clearly shown in Fig. 4. From this arrangement it will be seen that the attaching rivet 16 being sleeved upon the tubular stud 15 may rotate on the latter and the rivet also connecting the index arm 14 with the slide 11 will cause the two latter to rotate together.

In order to give a clear understanding of the manner of using my invention, I will now proceed to briefly describe the scales, charts, formula and data with which each of the members of the instrument is equipped but in this connection I wish to be understood that the invention is not limited to any particular or specific scale, formula or data, printed or otherwise, marked upon the members, or any of them, as it will be evident that the mathematical characters of the charts may be varied to suit the conditions and purposes for which the instrument might be used.

In describing the various scales, I shall begin with the scales at the periphery of each member of the instrument and shall treat with them in their successive order as they approach the center.

The obverse or top face of the base 10 in the chart shown herein is marked as follows: Scale $A^x$ is divided logarithmically from 1 to 10 through each half of its periphery. It is used in conjunction with scale $C^x$, and is so divided that any scale division or number on scale $A^x$ will lie radially opposite the square root of that number on scale $C^x$. Thus the scale division indicated as 144 on $A^x$ lies radially opposite the division 12 on scale $C^x$. This scale is termed "the scale of squares."

Continuing toward the center the next section $B^x$ contains two scales $b'$ and $b''$ as shown in Fig. 1. The one $b'$ registering from $-40$ to 500 is a temperature displacement scale located in such a manner that its freezing point (32° F.) coincides with the weight of one cubic foot of air (.0807 on scale $C^x$) at standard conditions of 32° F. and 29.92 inches of mercury pressure. It is used in conjunction with the several scales on the other members of the instrument in the rapid solution of problems dealing with air or other gases under other conditions than standard. The other scale $b''$ in this section is used in the novel solution of the resistance, weight, area and other characteristics of copper wire (Brown & Sharpe gage). In every case the numbers representing the different sizes of the wire are marked opposite constants on the scale $C^x$ equaling the diameters of the wires in circular mils. The next section $M^x$, contains a grouping of proportional factors and other miscellaneous data used in the reduction of one unit of length, volume, weight, etc., to another like unit. In addition are found some very useful constants used in engineering work and also a novel arrangement of the elements used in combustion problems, whereby the solution of the proportion of the molecular involved automatically effects the determination of the finite weights of the several elements. The interior scale $C^x$ is divided logarithmically as is the lower scales of the slide rule commonly known as the "Manheim rule." I shall not go into a lengthy discussion concerning this method of division as I claim no originality in this regard.

The bottom or reverse face of the base 10 is marked as follows: At the periphery is a scale $H^x$ having series of rows of numbers extending radially toward the center giving the characteristics of one pound of steam at various pressures and temperatures under saturated and superheated conditions. These values may be conveniently read by means of the slot $14^d$ in the index arm 14. Continuing inwardly are scales $J'$ used in determining the flux densities and magnetizing turns per unit length to produce this density for various materials commonly used in construction of magnetic circuits. At the center are similar scales $J''$ used in determining the flow of water over a rectangular weir and also scales $J'''$ indicating the current carrying capacities of standard wires with various insulations.

The circular slide 11 is marked as follows: Scale $D^x$ and $E^x$ are identical with scale $C^x$ as described heretofore. Scale $B^x$ is similar to scale $A^x$ as previously described. The cube scale $F^x$ is divided logarithmically through each one-third of its periphery in such a manner that any scale division or number on $F^x$ will lie radially opposite the cube root of that number on scale $D^x$. Thus the division 1728 on scale $F^x$ lies radially opposite the division 12 on scale $D^x$. The sine scale $G^x$ and tangent scale $G^y$ are so arranged that the above trigonometrical functions of a given angle may be read on scale $D^x$ by means of the hair-line 10—Fig. 1. The next scale $K^x$ is called the logarithmic scale or scale of equal parts. All of its divisions are of equal size and progress in a clockwise direction from 1 to 10. The logarithm of any number indicated on this scale may be read on scale $D^x$ by means of the hair-line 10 as previously described. Next is a series of scales shown at $L^x$ with a range of from 22,000 to its reciprocal and is used in the solution of problems involving the determination of fractional powers and roots of finite numbers. This series of scales is termed the "Log-log scales." At the center is a scale of temperatures $P^x$ used in conjunction with the scale bearing the numbers of copper wires of various diameters as described for base A (scale $b''$). This scale is used in the solution of problems dealing with wires at various temperatures.

The bottom face of the circular slide 11 is marked as follows: At the periphery are graphical representations $Q^x$ of the most important moments of inertia and of various conditions of beams under flexure loading accompanied by corresponding formulæ. One condition is shown in Fig. 2 at $Q^x$, i. e., a continuous member of uniform x-section fixed at both ends and centrally loaded with the weight P. On this face are also general formulæ for stress-strain problems, information concerning the properties of important materials of engineering, a table of molecular weights, a table describing the properties of the most important gases, a table for use in the solution of gear teeth problems using "Grant's odontograph method," specific heats of various metals, and fundamental formulæ under the following headings: direct and alternating current electricity, magnetism, vapors, steam, mechanics, hydraulics, combustion, trigonometry, etc., indicated generally at $R^x$.

The relatively large cursor 12 is marked as follows: At its periphery is scale $F^y$ similar to scale $E^x$ with the exception that its notation is in a direction opposite to the latter. At different points along scale $F^y$ are gage points noted as follows: $e$, V, $Mp$, L, D, M, $Tp$, W, S, T, HB, KA, and DC. These are used in the solution of specific problems for which this instrument is especially designed. The interior scale $S^x$ is a scale of equal parts notated in a direction opposite to the like scale on the circular slide 11 and is used in conjunction with this scale in the arithmetic addition of finite numbers. At the center is a series of gage points $T^x$ used in conjunction with the "Log-log" scales on slide 11 for the rapid solution of problems dealing with the ideal expansions and compressions of gases.

The reverse or bottom face of the index arm 14 is marked as follows: Extending from the periphery about one-third of the way to the center and adjacent to the slot $14^d$ as previously described, is a series of symbols $U^x$ referring to the different characteristics of saturated and superheated steam as seen through the slot. These symbols are so placed as to indicate the several characteristics of one pound of saturated or superheated steam under various conditions of temperature and pressure. Extending radially toward the center is another series of symbols $V^x$ used in conjunction with the magnetism and other scales as previously described for the bottom or reverse face of the base.

In order that the operation of my invention may be understood by engineers or others skilled in the art to which it pertains, I will now give several examples of its use.

Suppose it is desired to calculate the indicated horse power of a simple steam engine under the following conditions:

P = mean effective pressure = 218 #/sq. in.
L = stroke of engine = 2 ft.
A = area of piston = 230 sq. in.
N = revolutions per minute = 414 R. P. M.

$$\text{I. H. P.} = \frac{P \times L \times A \times N}{33,000} = \frac{218 \times 2 \times 230 \times 414}{33,000} = 1257.0 \text{ I. H. P.}$$

By means of the several scales this solution is greatly simplified. The procedure is as follows: Move the cursor 12 so that the mark 2 (stroke) on scale $F^y$ coincides with 230 (area) on scale $E^x$ of the circular slide 11. Move the indicator 13 so that its hairline ($13^c$) coincides or lies directly over the gage-point "H. I." (33,000) on scale $E^x$ of the circular slide 11. This solves for the value of $$\frac{\text{Stroke} \times \text{Area}}{33,000}$$

for the given engine which will remain a constant value for all variations of pressure (P) and R. P. M. (N). In this problem this constant = .01392. Next, leaving the indicator set to this constant, set the circular slide so that the value 1.0 (unity) on scale $D^x$ coincides with 414 on scale $C^x$ on the base 10. Now move the cursor 12 by means of the tongue $12^b$ so that the indicator hair-line $13^c$ lies directly over 218 (P) on scale $E^x$. It must be remembered that the indicator 13 is not moved in respect to the cursor 12 in this last operation. The result I. H. P. = 1257 will be shown on scale $C^x$ under the hair-line $12^d$ of cursor 12. Thus it will be seen that once the indicator is set for a given engine $$\left(\frac{A \times L}{33,000} = \text{Constant}\right)$$

the solution of any horsepower may be effected by one movement of the cursor 12 and one of the circular slides 11. This is a typical example showing the method of procedure used in solving expressions containing several variable and constant values. Thus, where a series of I. H. P. values for any given engine having varying pressures and R. P. M. $s$, is desired, the determination of each value may be effected by two settings of the instrument, once the constant setting has been made.

There are several constants on the cursor 12 by means of which much purely mechanical calculation may be eliminated. For instance, suppose that under ideal conditions a velocity of 10 ft. per sec. is imparted to a stream of water falling through a height "$h$." Wanted: a numerical value for "$h$" in feet.

$$h_2 = \frac{v^2}{g} = 1.535 \text{ (approx.)}$$

$h$ = height of fall.
$v$ = velocity of water in feet per second.
$g$ = 64.4 constant for action of gravity.

This problem may be rapidly solved by setting "$v$" on scale $F^y$ of the cursor opposite 10 on scale $C^x$ (on base 10) and reading "$h$" directly in ft. (1.535,) on scale $A^x$ under the hair-line $12^d$ Fig. 1. In the actual model the above problem would be effected by setting the gage-point "$v$" on scale $F^y$ to the given velocity (10 ft. per sec.) on scale E$^x$ and reading the height (1.535) on scale B$^x$ under the cursor hair-line on the circular slide B, (Fig. 7), (scale B$^x$ and scale A$^x$ being both square scales). This scale, (B$^x$), is not shown on Fig. 1 to avoid unnecessary complications.

Another example may be given for solving the area of a circle when the diameter is known. In this problem the gage-point "D" on scale F$^y$ is set over the given diameter on scale E$^x$ and the desired area may be read under the hair-line (12$^d$) on scale B$^x$ as was the height "$h$" in the preceding problem.

The solution of some problems would necessitate the use of every element of the instrument, for example: Required: the magnetic permeance of a cylinder of laminated silicon steel having a diameter of 3 centimeters and a length of 20 centimeters, its magnetic flux density to be 15.5 kilolines per square centimeter. The two formulæ which will be used in solving this problem will be found on the reverse face of the circular slide 11 and are observable through the opening 10$^a$.

The formula used in determining the permeance of a magnetic circuit is:

$$P = \frac{\mu A}{\lambda}$$

Wherein:
$\mu$ = permeability of the substance in "perms" per cubic centimeter.
"A" = area of substance in square centimeters.
$\lambda$ = length in centimeters.

Since the area "A" may be determined from the diameter ("D" 3 cm.) and the length "$\lambda$" is known ($\lambda$=20 cm.), the only unknown will be the permeability "$\mu$" which may be solved by the use of the formula:

$$\mu = \frac{B}{H}$$

Wherein:
B = flux density in kilolines per sq. cm. 15.5.
H = ampere-turns per cm. of length.

"H" may be determined by the use of the magnetic saturation curve for laminated silicon steel in the well known manner. The use of this curve, however, is made unnecessary by means of the scales J′ on the bottom face of the base 10. As shown on Fig. 2, an "H" of 20.5 ampere-turns per cm. will lie coincident with the radial edge of the index arm 14 when this edge is adjacent to a "B" of 15.5 kilolines per cm. Thus it will be seen that the value of "H" for any of the materials shown on the index arm 14 lies radially opposite the corresponding value of "B" on said arm. This will be found to be a distinct improvement over the method of "picking" the values from the saturation curves. Using the value of "H" (20.5) determined by means of the J′ scales as previously described and substituting in the second equation, we get:

$$\mu = \frac{B}{H} = \frac{15,500}{20.5} = 757 \text{ perms per cm. cubed.}$$

Set the hair-line 12$^d$ of the cursor 12 to 15.5 on scale C$^x$. Move the slide B so that 20.5 on scale D$^x$ lies under the hair-line 12$^d$. Read 757 on scale C$^x$ opposite the slide index or unity (1.0) on scale D$^x$ on the slide 11. Now that $\mu$ (757 perms) has been determined we substitute in the first equation:

$$P = \frac{\mu A}{\lambda} = \frac{\mu \pi D^2}{4 \times \lambda} = \frac{757 \times \pi \times 3^2}{4 \times 20} = 267$$

Set the hair-line 12$^d$ of the cursor 12 to 3 on scale C$^x$. Move the slide 11 until 20 on scale B$^x$ lies under the cursor hair-line 12$^d$. Set the hair-line 13$^c$ of the cursor 13 over the individual scale "D" on the cursor 12. With the cursor 13 set as above, move the cursor 12 so that the hair-line 13$^c$ lies over 757 on scale B$^x$ on the slide 11. Read the permeance (P 267 perms) on scale A$^x$ on the base 10 under the cursor hair-line 12$^d$. Thus, once $\mu$ is determined by means of the J′ scales used in conjunction with the index arm 14, and using the formulæ on the reverse face of the slide 11, the equation, $$\frac{\pi 3^2 \times 757}{4 \times 20} = 267 \text{ perms}$$

is solved by utilizing all the members of the instrument.

While I have herein shown and described one particular embodiment of my invention, I wish it to be understood that I do not confine myself to all the precise details of construction or to the particular marking of the instrument herein set forth by way of illustration, as modification and variation may be made without departing from the spirit of the invention or exceeding the scope of the appended claims.

What I claim is:

1. The combination with a base having scales marked on the obverse face thereof, of a circular slide rotatable over the obverse face of the base and having scales marked on the top side thereof said slide being of less diameter than the base, and an arm fixed to the pivot of the slide and movable over the reverse face of the base, said arm extending beyond the peripheral edge of the base whereby same may be engaged at its free end to effect rotation of the slide relative to the base.

2. The combination with a base having scales on the obverse face thereof, of a circular slide rotatable over the obverse face of the base and having scales marked on the top face thereof, said slide being of less diameter than the base, a transparent circular cursor rotatable over the top face of the slide and of less diameter than the latter, a radial tongue on said cursor, a second transparent cursor movable over the top face of the first cursor, and an arm fixed to the pivot of the slide and movable over the reverse face of the base, said arm extending beyond the peripheral edge of the base whereby same may be engaged at its free end to effect rotation of the slide relative to the base.

In testimony whereof, I affix my signature in the presence of two witnesses.

JOHN T. JONES.

Witnesses:
JAMES A. HAYDON,
PAUL JONES, Jr.